United States Patent [19]

Eulenburg

[11] Patent Number: 4,564,130

[45] Date of Patent: Jan. 14, 1986

[54] DISPENSER FOR PASTE-LIKE PRODUCTS

[75] Inventor: Jürgen Eulenburg, Neuss, Fed. Rep. of Germany

[73] Assignee: Josef Wischerath GmbH & Co., KG, Fed. Rep. of Germany

[21] Appl. No.: 589,067

[22] PCT Filed: Jun. 29, 1983

[86] PCT No.: PCT/EP83/00165

§ 371 Date: Feb. 28, 1984

§ 102(e) Date: Feb. 28, 1984

[87] PCT Pub. No.: WO84/00140

PCT Pub. Date: Jan. 19, 1984

[30] Foreign Application Priority Data

Jun. 29, 1982 [DE] Fed. Rep. of Germany ....... 3224199

[51] Int. Cl.[4] .............................................. G01F 11/00

[52] U.S. Cl. .................................... 222/207; 222/383

[58] Field of Search ............... 222/207, 209, 212, 215, 222/383, 386, 387, 401, 491, 494, 256; 417/560, 566; 137/512.4, 854, 859

[56] References Cited

U.S. PATENT DOCUMENTS 1,987,156 1/1935 Paparello ........................... 222/494
2,549,977 4/1951 Kundtz et al. .................. 222/209 X
3,160,329 12/1964 Radic et al. ..................... 222/207 X
3,162,334 12/1964 Miller ................................. 222/207
3,206,079 9/1965 Mancusi, Jr. ................... 222/494 X
3,361,305 1/1968 Spatz .................................. 222/207
3,527,242 9/1970 Ansite ......................... 137/512.4 X
3,820,689 6/1974 Cocita ................................ 222/207
4,301,948 11/1981 Czech et al. ........................ 222/341
4,420,101 12/1983 O'Neill ............................... 222/212

FOREIGN PATENT DOCUMENTS 0013691 8/1980 European Pat. Off. .
2344469 10/1977 France .

*Primary Examiner*—H. Grant Skaggs
*Assistant Examiner*—Kevin P. Shaver
*Attorney, Agent, or Firm*—Finnegan, Henderson, Farabow, Garrett & Dunner

[57] ABSTRACT

A dispenser for paste-like products comprises a headpiece including a discharge channel with a dispensing orifice, and a pump chamber the volume of which changes with the application of an external load and which is connected by a communication path, sealed by a check valve which can only open in the direction of the dispensing orifice, to said discharge channel, and said headpiece is connected to a container, the end of the container away from the headpiece being provided with an opening inside which is located a piston sliding in sealing engagement along the container interior wall, said connection between the headpiece and the container possibly being detachable. The interior of the container communicates with the pump chamber by a check valve, which can only open in the direction of the pumping chamber and which is mounted in a support base extending between the pump chamber and the container interior. The check valve between the pump chamber and the container includes a valve seat in the form of a conical element tapering toward the pump chamber and connected by bridges to the support base and surrounded by a number of passageways between the bridges. Furthermore, the check valve includes as its closure member a flexible apertured disk mounted coaxially with the conical element and held at its radial outer area on the support base while in the closed position it rests in sealing engagement of its inner rim with the surface of the conical element whereby it covers the passageways.

12 Claims, 4 Drawing Figures

DISPENSER FOR PASTE-LIKE PRODUCTS

Figure 1:
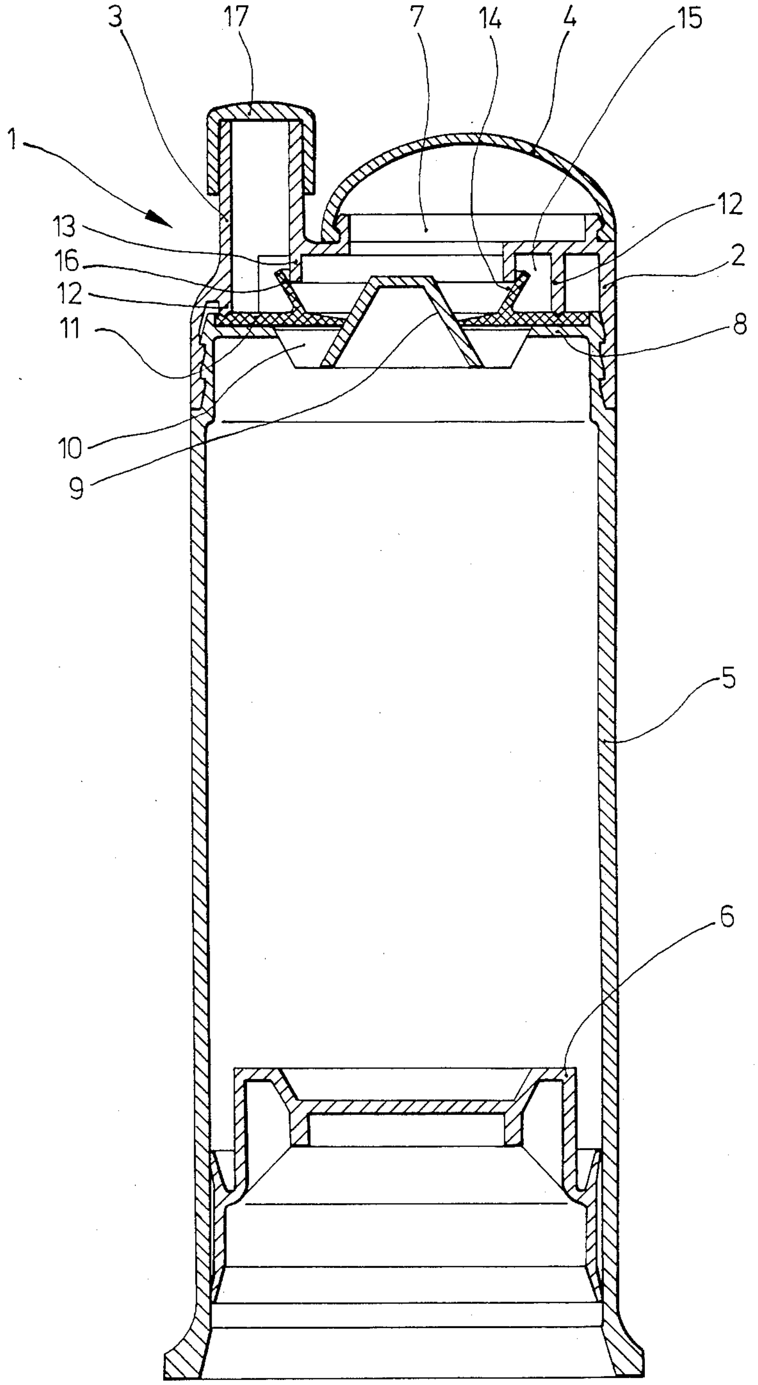

The invention concerns a dispenser for paste-like products provided with a headpiece including a discharge channel with a dispensing orifice and with a pump chamber, the volume of which is varied by means of external load, said pump chamber being connected by an outlet communicating path to said discharge channel which can be sealed by an outlet check valve which can be opened only in the direction of the dispensing orifice, and further provided with a container connected to said headpiece, the end of the container which is remote from the headpiece comprising an orifice and the container being internally equipped with a slidable piston moving in sealing engagement along the container interior wall, the interior of the container being connected to the pump chamber by means of an inlet check valve which can open only in the direction of the pump chamber and which is mounted in a support base extending between the pump chamber and the interior of the container.

It is possible using dispensers of the above discussed kind to dispense paste-like materials by means of a volumetric change of the pump chamber induced by an external load, for instance finger pressure applied to an actuation knob connected to a pump piston, and to dispense them in rates depending on said volumetric changes in the pump chamber. Atmospheric pressure is utilized for the purpose of forcing the paste-like mass out of the dispenser, this atmospheric pressure acting on the lower side of the piston sealing the interior of the end of the container remote from the headpiece and which following the generation of a partial vacuum in the pump chamber presses an amount of the paste-like mass into the pump chamber corresponding to the implemented volumetric change thereof. From there this amount will be forced, at the next volume decrease in the pump chamber and by means of operating the check-valves provided, through the discharge channel and out of the dispensing orific. Accordingly there is no need of special propellant means to expel the paste-like substance from the dispensers of the kind above discussed. The dispenser can be actuated with very modest forces, for instance finger pressure.

For economic employment of the dispensers of the above discussed kind and in particular for their use in packaging paste-like products used in large amounts, it is especially important to have the feasibility of economically manufacturing containers of the above discussed type in mass production.

It is the object of the invention to create a dispenser of the kind above discussed with a design of few parts which are sturdy and easily assembled, to be mass-produced economically and assembled efficiently, of which the operation is accurate and free from malfunction.

This problem is solved by the invention in that the inlet check valve is provided with a conical element tapering toward the pump chamber and acting as the valve seat, which is connected by bridges to the support base and which comprises a number of passageways circularly arranged around it between the bridges, and in that further an apertured disk made of a flexible material is provided and mounted coaxially with the conical element, tightly held on the support base at its radial outer area, which in the sealed position rests by its inner rim against the surface of the conical element and thereby covers the passageways.

The dispenser of the invention offers substantial advantages over the state of the art. The inlet check valve consists of two simple-shaped parts which can be manufactured efficiently. One part is the conical valve seat connected to the support base and comprising the passageways arranged peripherally around the valve seat. This part of the inlet check valve illustratively can be produced in great numbers and economically by injection molding. The design of the closure member of the inlet check valve as an apertured disk made of an elastic material also makes it possible to produce it in mass production. Again injection molding is applicable, for instance with elastomers. Furthermore when suitably shaping the apertured disk mass production by stamping is also possible. Due to simple geometry, in particular of the apertured disk, tooling costs for the production tools can be kept very low. In the light of the geometry of the inlet check valve of the dispenser of the invention, other components of this dispenser, in particular the headpiece and the container, can be kept to very simple shapes with few undercuts, making possible again in this respect very simple manufacturing tools, for instance for injection molding, and hence economical production. By the cooperation between a conical valve seat and an elastic apertured disk as the closure means, a reliable seal is obtained in the closed position. The danger of jamming of moving parts is excluded from the design of the invention. Accordingly, operation will be reliable.

Advantageously the dispenser of the invention is so designed that the closure member of the outlet check valve is integral with the apertured disk of the inlet check valve. In such a design the dispenser of the invention is assembled from especially few parts and accordingly manufacture and assembly are each particularly simple and economical.

An especially advantageous geometry of the dispenser of the invention is obtained when the closure member of the outlet check valve is a flexible, conically flaring annular wall mounted concentrically with the apertured disk to which it is joined integrally at its narrower end and, in the closed position, externally resting in sealing manner by its free flared end against the free rim of an annular collar forming a section of the pump chamber wall and terminating at a distance from the support base, the said free flared end sealing the periphery of said annular collar and thereby closing the communication path between the pump chamber and the discharge channel formed by the annular gap between the free rim of the annular collar and the apertured disk. In this design, once a vacuum has been generated in the pump chamber, the paste-like substance is forced first out of the container interior through an annular slit created by the vacuum-induced elastic upward flexure of the inner rim of the apertured disk around the periphery of the conical valve seat whereby said substance passes into the pump chamber. If thereupon the volume of the pump chamber is reduced again by external action, then the higher pressure so formed closes the inlet check valve whereby the inner rim of the apertured disk is forced again downward to come to rest on the conical valve seat. Simultaneously the pressure from the substance in the pump chamber elastically and uniformly deforms the conical annular wall of the closure member of the outlet check valve along its entire periphery in the outward direction, so that an annular gap is created between the free rim of the annular collar and the conical annular wall, and the said substance is forced through said annular gap into a space connected to the discharge channel and from this space it is forced out through the dispensing orifice. Due to the comparatively large periphery of the resulting annular slit, the flexure of the conical annular wall required to achieve an adequate cross-sectional passage for the substance to be dispensed is minute. As a result the distances between the open and closed positions of the closure members are also minute and hence the deformations are minute too. This is especially advantageous for the service life and reliability of the dispenser of the invention.

A further advantageous embodiment of the above described dispenser resides in that the thickness of the radial inner area of the apertured disk which is located radially within the conical annular wall is gradually tapered toward the inner rim. As a result the radial inner area of the apertured disk is especially flexible and the inner rim seals especially advantageously the conical valve seat when the inlet check valve is in the closed position, also providing a reliably adequate curvature of the radial inner area of the apertured disk toward the pump chamber when the inlet check valve is in the open position.

An alternatively advantageous design of the dispenser of the invention is achieved by forming the closure member of the outlet check valve by a medial annular area positioned concentrically on the surface of the apertured disk facing the pump chamber and at approximately equal radial distance from the inner and outer rims of the disk wherein said annular area resting in sealing engagement against the free lower rim of an annular collar arranged coaxially with the apertured disk and which in the closed position forms a section of the pump chamber wall, in this manner closes the communication path from the pump chamber to the discharge channel extending around said free lower rim of the annular collar. This design achieves an especially simple geometry of a simple, flat apertured disk forming the integrally joined closure members of the inlet and outlet check valves and accordingly also achieves the ensuing advantages in manufacture and assembly. In this design the radial inner area of the apertured disk in the presence of a vacuum curves upward into the pump chamber, that is, when the inlet check valve is in the open position, it curves upward and thus provides an annular slit between the inner rim of the apertured disk and the surface of the conical valve seat. The moment a higher pressure is produced in the pump chamber, the inner rim of the apertured disk comes to rest against the surface of the conical valve seat. The radial inner area of the apertured disk curves downward under the action of higher pressure from above, the radial outer area of the apertured disk resting on the support base and the inner rim of the apertured disk resting on the surface of the conical valve seat. Because the radial inner area of the apertured disk curves downward, an annular slit is created between the medial annular area of the disk acting as the closure member of the outlet check valve and the free lower rim of the annular collar forming a part of the pump chamber wall. The paste-like material in the pump chamber then can flow through this annular slit into an externally adjoining chamber connected to the discharge channel, whereby the substance is externally discharged through the orifice of the discharge channel.

The dispenser of the invention furthermore may assume such a design that together with an inlet check valve of the invention comprising a conical valve seat and apertured disk as the closure member, use is made of an outlet check valve mounted in the communication path between the pump chamber and the discharge channel and designed as a separate component. Illustratively the outlet check valve may comprise a closure member designed as an inset which can be installed in the discharge channel and which is equipped with an elastically hinged sealing flap covering the communication path in the closed position.

An especially simple design of the dispenser of the invention is achieved when the support base is integrally joined with the container and the radial outer area of the apertured disk is clamped and tightly held between the support base and a peripheral projection of the headpiece fixed to the container. The headpiece for such a design illustratively can be connected to the container by a snap fastener or also by means of a screw.

Another advantageous design of the dispenser of the invention is that wherein the support base forms part of the headpiece and wherein the apertured disk is supported within this headpiece. In this case the headpiece is connected detachably, for instance by a screw means to the container, and this container can be wholly open at the top. Such containers can be manufactured in especially simple manner as exchangeable containers and can be marketed also without headpieces. After filling, the upper opening of the container can be closed, for instance by sealing with a thin foil which is removed prior to connecting the container to the headpiece.

An especially simple design of the dispenser of the invention is provided by the pump chamber being sealed at its upper region by an elastically deforming cap which curves upward like a dome. Such a cap can be mass-produced from elastomeric materials, for instance by injection-molding, and it can be mounted in a simple manner to the headpiece, for instance by a snap fastener. By deforming the cap, for instance by finger pressure from above, large volumetric changes can be achieved in the pump chamber and hence correspondingly large discharges can be obtained.

Illustrative embodiments of the invention are described below in relation to the drawing.

Figure 2:
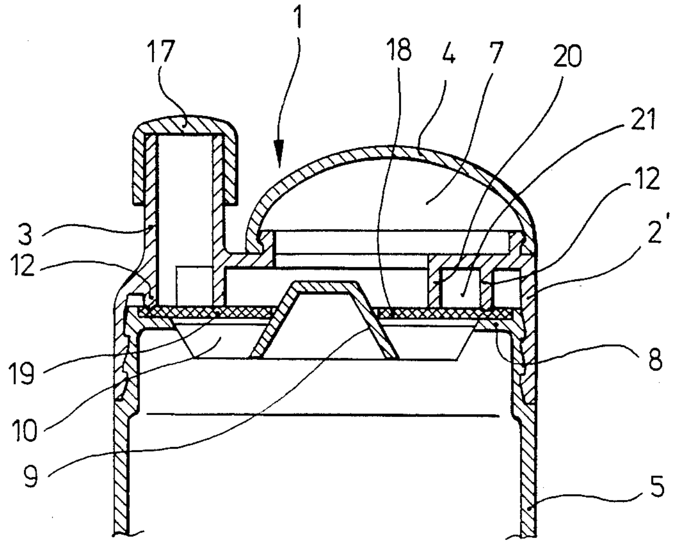
Figure 3:
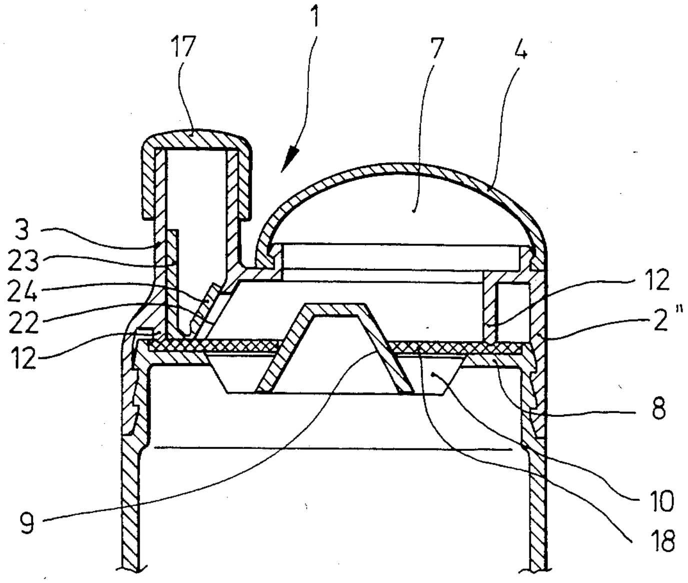
Figure 4:
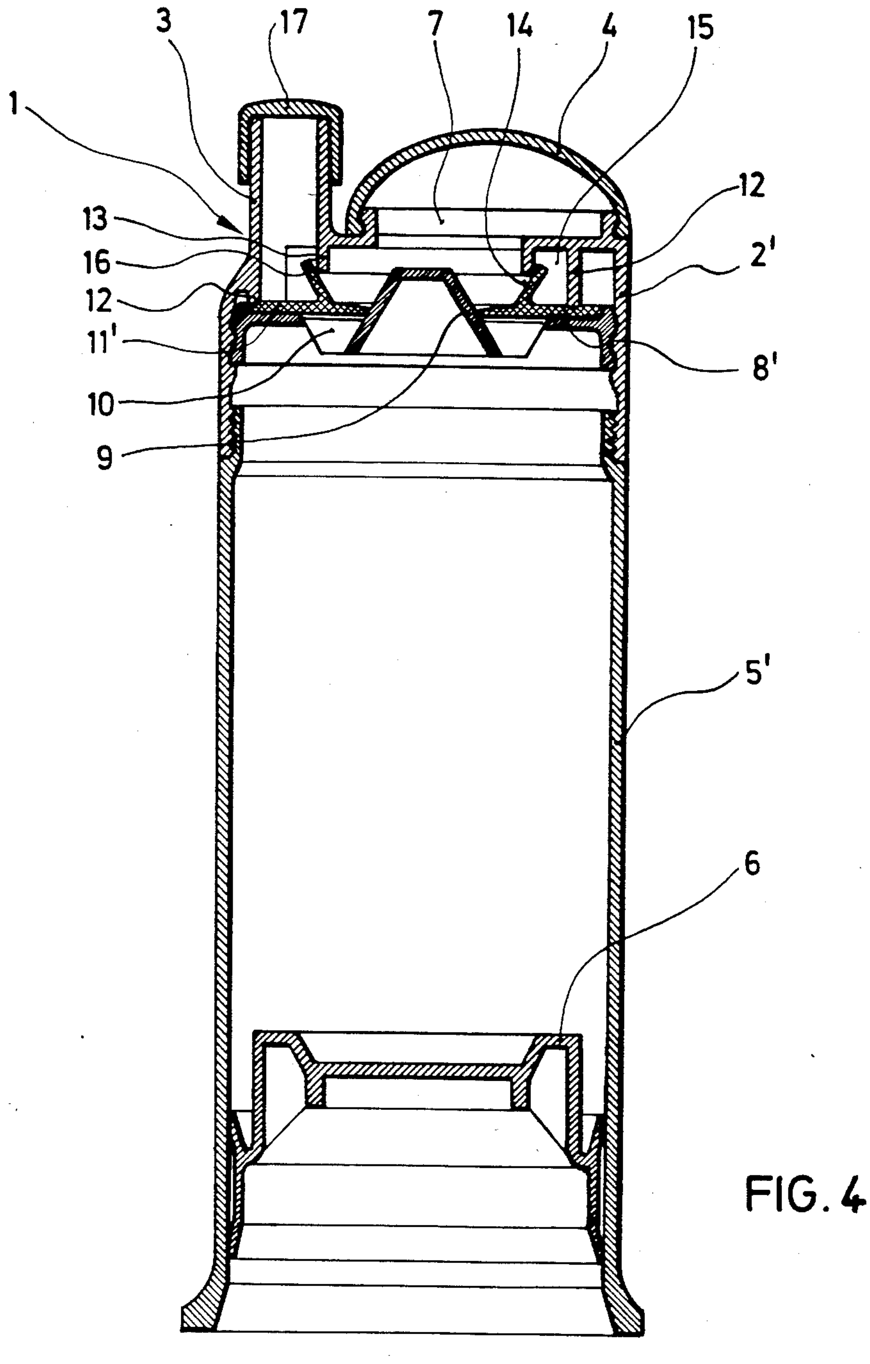

FIG. 1 is an axial section of a dispenser of a first embodiment of the invention, FIG. 2 is an axial section of the upper region of a dispenser of the invention in a second embodiment, FIG. 3 is an axial section of the upper region of a dispenser of the invention in a third embodiment, and FIG. 4 is an axial section of a dispenser of the invention in a fourth embodiment.

FIG. 1 is a longitudinal section of a first embodiment of the dispenser. The headpiece 1 of this dispenser consists of a plastic, injection-molded component 2 provided with a discharge channel 3 and a cap 4 made of an elastically yielding plastic, which is connected in snap-in fashion to the component 2. The component 2 is connected at its lower end by a snap-in means to the upper end of a container 5. This container also is made of an injection-molded plastic and assumes a cylindrical shape. The lower end of the container 5 is open. A slidable piston 6 is inserted into the container in sealing engagement with the interior wall thereof. The piston 6 also is made of an injection-molded plastic.

A pump chamber 7 within the headpiece 1 is defined at its sides by the walls of the component 2 and at its top by the cap 4. A transverse wall is integrally joined to the upper end of the container 5 and forms the support base 8. A valve seat for an inlet check valve in the form of a conical element 9 tapering toward the pump chamber 7 is mounted in the support base 8 coaxially with the central axis of the container and is connected by bridges 10 to the pump chamber support base 8. Passageways are provided all around the element 9 between the bridges 10 to connect the interior of the container 5 with the pump chamber 4. The closure member of the inlet check valve is an apertured disk 11 made of a highly flexible plastic and arranged coaxially with the element 9. The apertured disk 11 rests by its radial outer area and lower surface on its entire periphery or outer rim on the support base 8. An annular peripheral projection 12 extends downward from component 2 of headpiece 1 toward the radial outer area of the apertured disk 11 and after the component 2 is fastened to the container 5, this projection 12 is pressed from above on the radial outer area of the apertured disk which thereby is clamped and tightly held in position. FIG. 1 shows the apertured disk in the closed position of the inlet check valve. In that case the inner rim of the apertured disk 11 rests in sealing engagement with the conical surface of the element 9. The thickness of the apertured disk 11 is gradually tapered in the radial inner area thereof toward the inner rim.

An annular wall in the form of a downwardly projecting collar 13 is provided in the component 2 of the headpiece 1. This annular collar 13 forms a section of the wall of the pump chamber 7. The free lower rim of the collar 13 ends at a distance above the support base 8. As the result thereof an annular gap 14 is provided which connects the pump chamber 7 to a chamber 15 which in turn merges into and communicates with the discharge channel 3. An outlet check valve is provided to seal the communication path of annular gap 14 between the pump chamber 7 and the discharge channel 3. The closure member of the outlet check valve is designed as an elastically flexible and conically flaring annular wall 16 arranged concentrically with the apertured disk 11 and integrally joined at its lower narrower end to the disk 11. When the outlet check valve is in the closed position, the inner surface of annular wall 16 rests against the free rim of collar 13 so as to be circumferentially sealing and thereby closes the annular gap 14.

The operation of the dispenser of FIG. 1 will now be described below. A paste-like substance is located inside the container 5 between the piston 6 and the support base 8. In order to dispense an amount of this substance, the sealing cap 17 first is removed from the feed orifice of the discharge channel 3. Both the closure members of the inlet and outlet check valves are in the closed position shown in FIG. 1. By pushing-in the cap 4, using for instance a finger, the volume of the pump chamber 7 drops. Excess pressure is generated thereby, which forces the inner rim of apertured disk 11 in sealing engagement with the conical surface of the element 9. Simultaneously the increased interior pressure causes outward bulging of the conical annular wall 16, so that an annular gap 14 is created between said conical annular wall and the free end of the collar 13. If at the beginning of the procedure there already was paste-like material in the pump chamber, this material then is forced by the higher pressure through the annular gap 14 into the chamber 15 and from there into the discharge channel 3, and through the orifice of the discharge channel it then reaches the outside. The moment the force on the cap 4 ends, this cap elastically resumes its initial shape and the volume of the pump chamber again enlarges. The partial vacuum so generated causes the conical annular wall 16 to elastically resume its initial position whereby it comes to rest against the lower rim of collar 13 and thereby again seals the pump chamber 7 from the discharge channel. Simultaneously the vacuum causes an upward bulging of the radial inner area of the apertured disk 11, whereby its inner rim lifts off the conical surface of the element 9 and provides an annular slit. Due to the pressure difference between the higher atmospheric pressure and the vacuum in the pump chamber, the piston 6 is forced upward. As a result paste-like material is moved through the open annular slit into the pump chamber 7. The moment the pressure in the pump chamber 7 has come up to atmospheric, the upwardly curved radial inner area of apertured disk 11 elastically moves down, whereby the inner rim of the disk comes to rest against the surface of the element 9 and the inlet check valve is closed. Thereupon the dispensing process already described can start again.

FIG. 2 illustrates an axial section of the upper region of a second embodiment of the dispenser. To the extent the components of this second embodiment are the same as those of the embodiment of FIG. 1, they are denoted by the same reference numerals. These components therefore will not be described again. The lower part of the container, not shown in FIG. 2, can be of the same design as in FIG. 1.

In the embodiment of FIG. 2 a single apertured disk 18 made of a highly elastic plastic is provided as the closure member both for the inlet check valve and the outlet check valve; in the closed position, the inner rim of disk 18 rests in sealing engagement with the conical surface of the element 9. Accordingly the radial inner area of the apertured disk 18 forms the closure member of the inlet check valve. The upper surface of annular section 19 located in the radial direction approximately centrally between the inner rim and the radial outer area of the apertured disk 18 and facing the pump chamber acts as the closure member for the outlet check valve. When the outlet check valve is in the closed position, the annular section 19 of apertured disk 18 rests against the lower rim of annular collar 20 arranged coaxially with the apertured disk and integral with component 2' of the headpiece 1. The annular collar 20 forms a section of the wall of the pump chamber 7.

If the volume of the pump chamber 7 of the dispenser of FIG. 2 is decreated by depressing the cap 4, then the inner rim of the apertured disk 18 will also be forced in sealing engagement with the conical element 9 which then supports it. The inlet check valve is thus closed. Simultaneously the pressure in the pump chamber causes the apertured disk 18 to curve downward in the area between the inner rim and the radial outer, clamped area thereof. As a result the annular section 19 moves away from the lower rim of the annular collar 20. Any paste-like substance in the pump chamber can pass through the generated annular slit into an annular space 21 externally surrounding the annular collar 20 and from there into the discharge channel 3. In the course of a subsequent increase in volume upon load-relief of the cap 4, the apertured disk 18 elastically resumes its plane position, whereby the annular section 19 again sealingly engages the lower rim of the annular collar 20 and thereby closes the outlet check valve. Because of the vacuum so generated in the pump chamber 7, the radial inner area of apertured disk 18 is simultaneously curved upward with the apertured disk resting against the free lower rim of the annular collar 20. Thereupon the atmospheric pressure forces the paste-like substance from the inside of the container 5 through the annular slit resulting between the inner rim of the apertured disk 18 and the conical element 9 into pump chamber 7. The moment the pressure in the pump chamber reaches atmospheric, the radial inner area of apertured disk 18 elastically returns to its initial position and closes the inlet check valve. Thereupon the dispensing process can be repeated.

FIG. 3 is an axial section of the upper region of a third dispenser embodiment. To the extent the components in this embodiment are the same as those of the illustrative embodiments shown in FIGS. 1 and/or 2, they are also denoted by the same reference numerals. Accordingly, such components will not be discussed again. In this embodiment the apertured disk 18 is used solely as the closure member for the inlet check valve. Walls supporting circumferential projection 12 are integral with component 2" of the headpiece 1 and laterally define the pump chamber 7. An opening 22 in one of these defining walls represents the communication path between the pump chamber 7 and the discharge channel 3. An inset 23 made of an injection-molded plastic is mounted in the discharge channel 3 and is integrally provided by means of a narrow hinge strap with a flap 24. This flap 24 in the closed position externally covers the opening 22. If the pressure in the pump chamber exceeds atmospheric, the flap 24 is elastically pivoted outward and thus opens the communication path between the pump chamber and the discharge channel. The embodiment of FIG. 3 operates similarly to those of the dispensers of FIGS. 1 and 2.

FIG. 4 shows the axial section of a fourth embodiment of the dispenser of the present invention. To the extent the components of this fourth embodiment are the same as those of the illustrative embodiments shown in FIGS. 1 and/or 2 and/or 3, they are also denoted by the same reference numerals and will not be discussed again. In this embodiment, the support base 8' is a component of the headpiece 1 and the apertured disk 11' is held in place in the headpiece.

The invention is not restricted to the shown illustrative embodiments. It is possible for instance to make use of a component of the headpiece as the support base and to hold the apertured disk in place in the headpiece. Again it is possible for instance to design the connection between the headpiece and the container as a detachable connection such as a screw connection. Such a design makes it possible to make the container disposable and to market such disposable containers separately from the headpiece. The container proper can be designed to be especially simple and to be manufactured economically. Prior to use the filled disposable container may be sealed at its free upper end by a foil to be removed before joining the container to the headpiece.

While it is very advantageous for the dispenser of the invention to design the valve seat of the first check valve as a frustrum of a cone with symmetry of rotation and straight generatrix, deviations from such a design and within the scope of the invention are nevertheless possible. For instance the valve seat may assume the geometry of an upwardly tapering body of rotation with a curved generatrix. Again it is possible within the scope of the invention to use upwardly tapering valve seats which lack symmetry of rotation. In that case the apertured disk must be replaced by a disk of which the opening is suitably fitted to the contour of the valve seat. Such a geometry may be appropriate for instance when the outer shape of the dispenser is desired to deviate from symmetry of rotation, being illustratively rectangular.

All features found in the description and the drawing furthermore can be combined in arbitrary manner to remain within the scope of the invention.

I claim:

1. A dispenser for paste-like products comprising: a headpiece including a discharge channel with a dispensing orifice and a pump chamber, the volume of said pump chamber being variable by external actuation and said pump chamber being in communication with said discharge channel via a path blockable only in the direction of said dispensing orifice by means of an outlet check valve; and a container with opposite longitudinally spaced apart ends having one end connected to said headpiece, the end of the container remote from the headpiece having an orifice and a slidable piston in said orifice and in sealing engagement with the interior wall of said container, said container being in communication with said pump chamber via an inlet check valve opening only in the direction of said pump chamber and mounted on a support base extending between said pump chamber and the interior of said container, wherein said inlet check valve includes a valve seat comprising a conical element tapering toward said pump chamber, said conical element being connected to said support base through bridges and surrounded by a plurality of passageways between said bridges, said inlet check valve including further an inlet closure member comprising an apertured disk of flexible material having a radial outer area, a radial inner area and having an inner rim defining the aperture therein, said apertured disk being positioned coaxially with said conical element and with said radial outer area tightly held on said support base and, in the closed position of said inlet closure member, said inner rim being positioned in sealing engagement with said conical element thereby closing said passageways, wherein said headpiece includes an integral annular collar having a free rim terminating at a distance from said support base and defining an annular gap between said free rim and said apertured disk, and wherein said outlet check valve includes an outlet closure member comprising a flexible annular wall positioned concentrically and integral with said apertured disk and flaring conically therefrom to provide a free flared end of said annular wall and, in the closed position of said outlet closure member, said free flared end being positioned in sealing engagement with the free rim of said annular collar, thereby closing said annular gap.

2. The dispenser according to claim 1 wherein said support base is integral with said container and wherein the radial outer area of said apertured disk is tightly held on said support base by a peripheral projection extending downward from said headpiece.

3. The dispenser according to claim 1 wherein the support base is a component of said headpiece and wherein the apertured disk is held in place in the headpiece.

4. The dispenser according to claim 1 wherein said pump chamber is defined at its top by an elastically deformable dome-shaped cap.

5. The dispenser according to claim 1, wherein the radial inner area of said apertured disk is tapered toward the inner rim thereof.

6. The dispenser according to claim 5 wherein said support base is integral with said container and wherein the radial outer area of said apertured disk is tightly held on said support base by a peripheral projection extending downward from said headpiece.

7. The dispenser according to claim 3 wherein the support base is a component of said headpiece and wherein the apertured disk is held in place in the headpiece.

8. The dispenser according to claim 5 wherein the pump chamber is defined at its top by an elastically deformable dome-shaped cap.

9. A dispenser for paste-like products comprising: a headpiece including a discharge channel with a dispensing orifice and a pump chamber, the volume of said pump chamber being variable by external actuation and said pump chamber being in communication with said discharge channel via a path blockable only in the direction of said dispensing orifice by means of an outlet check valve; and a container having opposite longitudinally spaced apart ends having one end connected to said headpiece, the end of the container remote from the headpiece having an orifice and a slidable piston in said orifice and in sealing engagement with the interior wall of said container, said container being in communication with said pump chamber via an inlet check valve opening only in the direction of said pump chamber and mounted on a support base extending between said pump chamber and the interior or said container, wherein said inlet check valve includes a valve seat comprising a conical element tapering toward said pump chamber, said conical element being connected to said support base through bridges and surrounded by a plurality of passageways between said bridges, said inlet check valve including further an inlet closure member comprising an apertured disk of flexible material having a radial outer area and having an inner rim defining the aperture therein, said apertured disk being positioned coaxially with said conical element with said radial outer area tightly held on said support base and, in the closed position of said inlet closure member, said inner rim being positioned in sealing engagement with said conical element thereby closing said passageways, wherein a component of said headpiece includes an integral annular collar forming a portion of the wall of the pump chamber and having a free rim terminating at a distance from said support base and defining an annular slit therebetween, and wherein said outlet check valve includes an outlet closure member comprising an annular area on the upper surface of the apertured disk facing said pump chamber and at approximately equal radial distance between the radial outer area and inner rim of the apertured disk and, in the closed position of said outlet closure member, said annular area being positioned in sealing engagement with the free rim of said annular collar thereby closing said annular slit.

10. The dispenser according to claim 9 wherein said support base is integral with said container and wherein the radial outer area of said apertured disk is tightly held on said support base by a peripheral projection extending downward from the headpiece.

11. The dispenser according to claim 9 wherein the support base is a component of said headpiece and wherein the apertured disk is held in place in the headpiece.

12. The dispenser according to claim 9 wherein pump chamber is defined at its top by an elastically deformable dome-shaped cap.

* * * * *